(12) United States Patent
Nakano et al.

(10) Patent No.: US 9,704,024 B2
(45) Date of Patent: Jul. 11, 2017

(54) OBJECT DISCRIMINATING APPARATUS AND METHOD

(71) Applicant: CANON KABUSHIKI KAISHA, Tokyo (JP)

(72) Inventors: Shunsuke Nakano, Kawasaki (JP); Hiroshi Sato, Kawasaki (JP); Yuji Kaneda, Kawasaki (JP); Takashi Suzuki, Tokyo (JP); Atsuo Nomoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 14/666,139

(22) Filed: Mar. 23, 2015

(65) Prior Publication Data

US 2015/0278584 A1 Oct. 1, 2015

(30) Foreign Application Priority Data

Mar. 31, 2014 (JP) ................................ 2014-073819

(51) Int. Cl.
*G06K 9/00* (2006.01)
*G06K 9/46* (2006.01)

(52) U.S. Cl.
CPC ....... *G06K 9/00288* (2013.01); *G06K 9/4661* (2013.01)

(58) Field of Classification Search
CPC .. G06K 9/00288; G06K 9/00234; G06K 9/52; G06K 9/62; G06T 7/0038;

(Continued)

(56) References Cited

U.S. PATENT DOCUMENTS 5,760,346 A 6/1998 Kobayashi et al.
5,761,087 A 6/1998 Yoshimura et al.
(Continued)

FOREIGN PATENT DOCUMENTS

JP 2007-140823 A 6/2007

OTHER PUBLICATIONS

U.S. Appl. No. 14/666,139, filed Mar. 23, 2015. Applicants: Shunsuke Nakano, et al.

(Continued)

*Primary Examiner* — Li Liu
(74) *Attorney, Agent, or Firm* — Fitzpatrick, Cella, Harper & Scinto

(57) ABSTRACT

An object discriminating apparatus is provided with an obtaining unit configured to obtain an input image including an object; an extracting unit configured to extract a feature from the input image; a calculating unit configured to calculate, by collating the feature extracted from the input image and a feature of a previously registered registration image with each other, similarity between the object included in the input image and an object included in the registration image; a deriving unit configured to derive a difference between a variation in the input image and a variation in an output image; a converting unit configured to convert the calculated similarity on the basis of the derived difference between the variations; and a deciding unit configured to decide, on the basis of the converted similarity, whether or not the object included in the input image is identical with the object included in the registration image.

15 Claims, 9 Drawing Sheets

(58) Field of Classification Search
CPC ............. G06T 7/60; G06T 2207/20224; G06T 2200/21; G06T 2207/10004; G06T 2207/10016; G06T 2207/30196; G06T 2207/30232

See application file for complete search history.

(56) References Cited

U.S. PATENT DOCUMENTS

| | | | |
|---|---|---|---|
| 5,862,049 | A | 1/1999 | Sato et al. |
| 6,225,986 | B1 | 5/2001 | Sato et al. |
| 6,239,792 | B1 | 5/2001 | Yanagisawa et al. |
| 6,288,711 | B1 | 9/2001 | Tanaka et al. |
| 6,611,258 | B1 | 8/2003 | Tanaka et al. |
| 7,881,524 | B2 | 2/2011 | Matsugu et al. |
| 7,912,253 | B2 | 3/2011 | Suzuki et al. |
| 8,130,281 | B2 | 3/2012 | Kaneda et al. |
| 8,331,655 | B2 | 12/2012 | Sato et al. |
| 8,515,136 | B2 | 8/2013 | Mori et al. |
| 8,527,439 | B2 | 9/2013 | Torii et al. |
| 8,624,994 | B2 | 1/2014 | Kaneda et al. |
| 8,626,782 | B2 | 1/2014 | Sato |
| 8,761,459 | B2 | 6/2014 | Kaneda et al. |
| 8,781,235 | B2 | 7/2014 | Suzuki et al. |
| 8,787,629 | B2 | 7/2014 | Kaneda et al. |
| 8,929,595 | B2 | 1/2015 | Suzuki et al. |
| 8,942,436 | B2 | 1/2015 | Mori et al. |
| 9,036,917 | B2 | 5/2015 | Kaneda et al. |
| 2011/0158540 | A1 | 6/2011 | Suzuki et al. |
| 2011/0243398 | A1* | 10/2011 | Suzuki ............... G06K 9/00288 382/118 |
| 2013/0142401 | A1 | 6/2013 | Nomoto et al. |
| 2013/0329970 | A1* | 12/2013 | Irie .................... G06K 9/00288 382/118 |
| 2014/0056509 | A1 | 2/2014 | Nakashima et al. |
| 2015/0112970 | A1* | 4/2015 | Hirai .................. G06K 9/00221 707/722 |
| 2015/0139492 | A1* | 5/2015 | Murakami ........ G06F 17/30247 382/103 |
| 2015/0146991 | A1 | 5/2015 | Nakano et al. |
| 2015/0339515 | A1* | 11/2015 | Tomita ............... G06K 9/00221 382/118 |

OTHER PUBLICATIONS

U.S. Appl. No. 14/664,085, filed Mar. 20, 2015. Applicants: Hiroshi Sato, et al.

T. Ahonen, et al., "Face Recognition with Local Binary Patterns", ECCV, LNCS 3021, pp. 469-481 (2004).

T. Kanade, et al., "Multi-Subregion Based Probabilistic Approach Toward Pose-Invariant Face Recognition", Proc. of IEEE International Symposium on Computational Intelligence in Robotics and Automation (CIRA) (Jul. 2003).

T. F. Cootes, et al., "Active Shape Models—Their Training and Application", Computer Vision and Image Understanding, vol. 61, No. 1, pp. 38-59 (Jan. 1995).

* cited by examiner

○ : SIMILARITY CONVERSION MODEL

○ : SIMILARITY CONVERSION MODEL

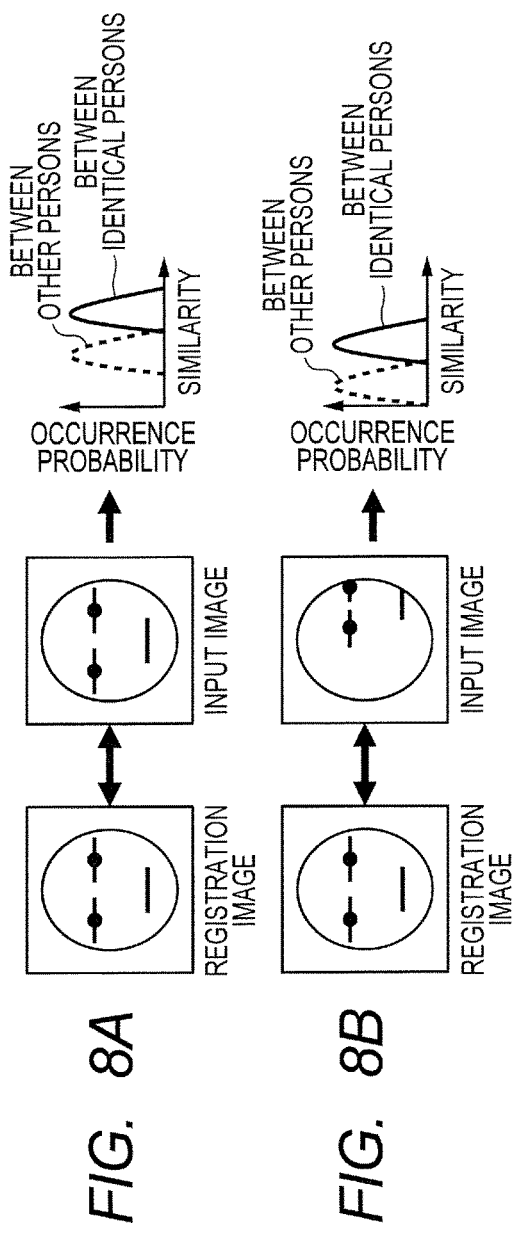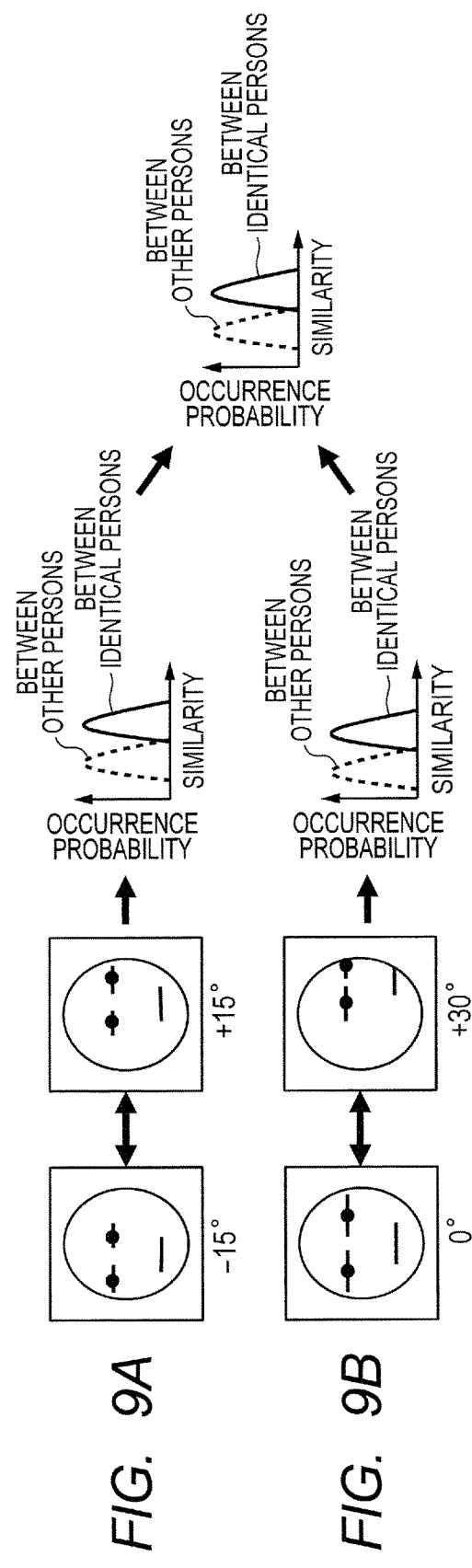
FIG. 8A  FIG. 8B  FIG. 9A  FIG. 9B

OBJECT DISCRIMINATING APPARATUS AND METHOD

BACKGROUND OF THE INVENTION

Field of the Invention

The present invention relates to object discriminating apparatus and method which are particularly suitable to discriminate an object in which a variation might occur.

Description of the Related Art

Various techniques of discriminating to which previously registered categories an object represented by an input image belongs, by comparing the input image with a previously registered image, have been proposed. As a concrete example of the object discriminating technique, there is person authentication which discriminates a person by using an individual inherent feature such as a face, a fingerprint or the like. Here, the person authentication using the face is called face authentication, and the person authentication using the fingerprint is called fingerprint authentication.

A category in the person authentication corresponds to a name, an ID and the like by which an individual can be identified. To discriminate an object such as a person or the like, it is necessary to previously register, as a registration image, an image of the object intended to be discriminated, together with its name and ID. Namely, by previously registering the registration image, it is possible to actually bring the discrimination into effect. If an image of the object to be discriminated (hereinafter, called an input image) is input, the input image is collated with each of the previously registered registration images. Then, if the matched registration image is found, the category of the object corresponding to the matched registration image is output as a discrimination result. On the other hand, if the matched registration image is not found, a result indicating that there is no appropriate object is output. Hereinafter, discrimination of the category of the object means decision of an individual difference of the object (e.g., a difference of person).

As a simplest technical method of discriminating a person from a face image, there is a method of obtaining the pixels of the face image itself as feature quantities, and directly comparing the obtained feature quantities with others. However, in this method, when a variation state of face direction, look, lighting or the like is different between two faces, there is a case where the difference of the pixel values due to the difference of the variation states becomes stronger or larger than the difference of the feature quantities due to the difference of persons. In other words, a phenomenon that similarity between different persons in the same variation state is higher than similarity between the same person in the different variation states might occur. Under the circumstances, various techniques such as a technique of performing comparison based on the feature quantities from which the differences of variation states have been eliminated have been proposed (e.g., "Face Recognition with Local Binary Patterns" T. Ahonen and A. Hadid, M. Pietikainen, 1994"). However, the above problem cannot be still solved sufficiently.

Besides, as another approach for solving the above problem, a technique of normalizing similarity according to a variation factor has been proposed (e.g., Japanese Patent Application Laid-Open No. 2007-140823; and "Multi-Subregion Based Probabilistic Approach Toward Pose Invariant Face Recognition" T. Kanade and A. Yamada, 2003). In this method, the magnitude of similarity due to the difference of variation factor is normalized using a conversion model of similarity previously obtained for each variation factor, thereby aiming to avoid the phenomenon that the similarity between the different persons in the same variation state is higher than the similarity between the same person in the different variation states.

To accurately discriminate the category of the object irrespective of the variation factor, it is thought that the combination of the variation states of both the images intended to be collated is obtained, and the conversion model of similarity corresponding to the obtained combination of the variation states is selected. However, for example, if the direction in which the object is photographed is used as the variation factor, the conversion models as many as the combinations of the object directions are necessary. Moreover, the number of the combinations of the variation states becomes larger at an accelerated pace as the direction in which the object can take becomes wider, and thus the number of the conversion models increases. Moreover, for example, if the direction of a light source irradiating the object is considered in addition to the object direction itself, the conversion models as many as the combinations obtained by further adding together the combinations of the object directions and the combinations of the light source directions are necessary. As a result, the increase in the number of the conversion models excessively reduces the capacity of a recording apparatus for storing the conversion models.

The present invention aims to be able to accurately discriminate the object irrespective of variations.

SUMMARY OF THE INVENTION

According to one aspect of the present invention, an object discriminating apparatus comprises: an obtaining unit configured to obtain an input image including an object; an extracting unit configured to extract a feature from the input image; a calculating unit configured to calculate, by collating the feature extracted from the input image and a feature of a previously registered registration image with each other, similarity between the object included in the input image and an object included in the registration image; a deriving unit configured to derive a difference between a variation in the input image and a variation in an output image; a converting unit configured to convert the calculated similarity on the basis of the derived difference between the variations; and a deciding unit configured to decide, on the basis of the converted similarity, whether or not the object included in the input image is identical with the object included in the registration image.

Further features of the present invention will become apparent from the following description of exemplary embodiments with reference to the attached drawings.

BRIEF DESCRIPTION OF THE DRAWINGS

FIGS. 8A and 8B are diagrams illustrating an example of probability distributions of the similarity when the face angles are in the same and different conditions between the registration image and the input image.

FIGS. 9A and 9B are diagrams illustrating an example of probability distributions of the similarity when the difference between the face angles of the registration image and the input image is in the same condition.

DESCRIPTION OF THE EMBODIMENTS

First Embodiment

Hereinafter, the first embodiment of the present invention will be described in detail with reference to the attached drawings. In the present embodiment, the difference in visibility generated by a positional relation between an object and an image pickup device is treated as a variation factor related to visibility of an object. Specifically, although a direction of an object in an image, the resolution of an object being displayed in an image (the size of an object in an image) can be enumerated, it will be described by exemplifying an object in the yaw direction in the present embodiment. Further, in the present embodiment, a person's face is used as an object and it will be described by exemplifying face authentication for discriminating the difference of a person from an image as a category of the object.

<Overall Constitution>

Figure 1:
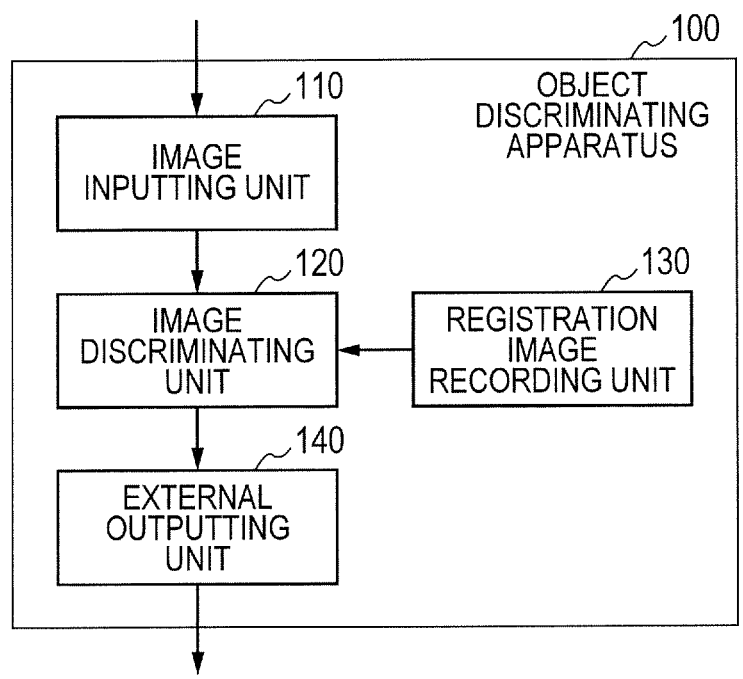
FIG. 1 is a block diagram illustrating an example of the functional constitution of an object discriminating apparatus.

FIG. 1 is a block diagram illustrating an example of the functional constitution of an object discriminating apparatus 100 according to the present embodiment. As illustrated in FIG. 1, the object discriminating apparatus 100 has an image inputting unit 110 for inputting images, an image discriminating unit 120 for discriminating an image, a registration image recording unit 130 for holding a registration image and an external outputting unit 140 for outputting a discrimination result and an attribute decision result of the object.

The image inputting unit 110 is not especially limited if it is a device for supplying images to be discriminated. It may be an image pickup device which has an optical lens and a video sensor or a semiconductor memory which can hold and read out images. Images to be successively discriminated at a time of day are supplied by the image inputting unit 110. The image discriminating unit 120 is, for example, a dedicated circuit (ASIC (Application Specific Integrated Circuit)), a processor (a reconfigurable processor, a DSP (Digital Signal Processor), a CPU (Central Processing Unit)) or the like. Also, it may exist as a program to be executed at the inside of a single dedicated circuit and a general-purpose circuit (a CPU for a PC). The detailed constitution of the image discriminating unit 120 will be described later.

The registration image recording unit 130 records and holds an image, which was input from the image inputting unit 110 as a registration image, as a dictionary. The registration image recording unit 130 is typically a repeatedly rewritable semiconductor memory, and it is desirable to have a sufficiently large capacity in order to hold several tens images or more. However, only the information to be used at the image discriminating unit 120 may be held instead of images themselves. The details of this information will be described later.

The external outputting unit 140 outputs a discriminated result of the image discriminating unit 120, that is, a category, to which an object in an input image belongs, to an external with an appropriate form. The external outputting unit 140, which is typically a monitor such as a TFT (Thin Film Transistor) liquid crystal display or the like, displays an image obtained from the image inputting unit 110 or superimposingly displays the discriminated result of the image discriminating unit 120 on the image. Further, the above discriminated result may be output to an external storage medium or the like as electronic data or may be printed on a paper medium. Note that an outputting unit is not limited to the above-enumerated unit, and further, plural units may be used at the same time.

<Discriminating Flow>

Figure 2:
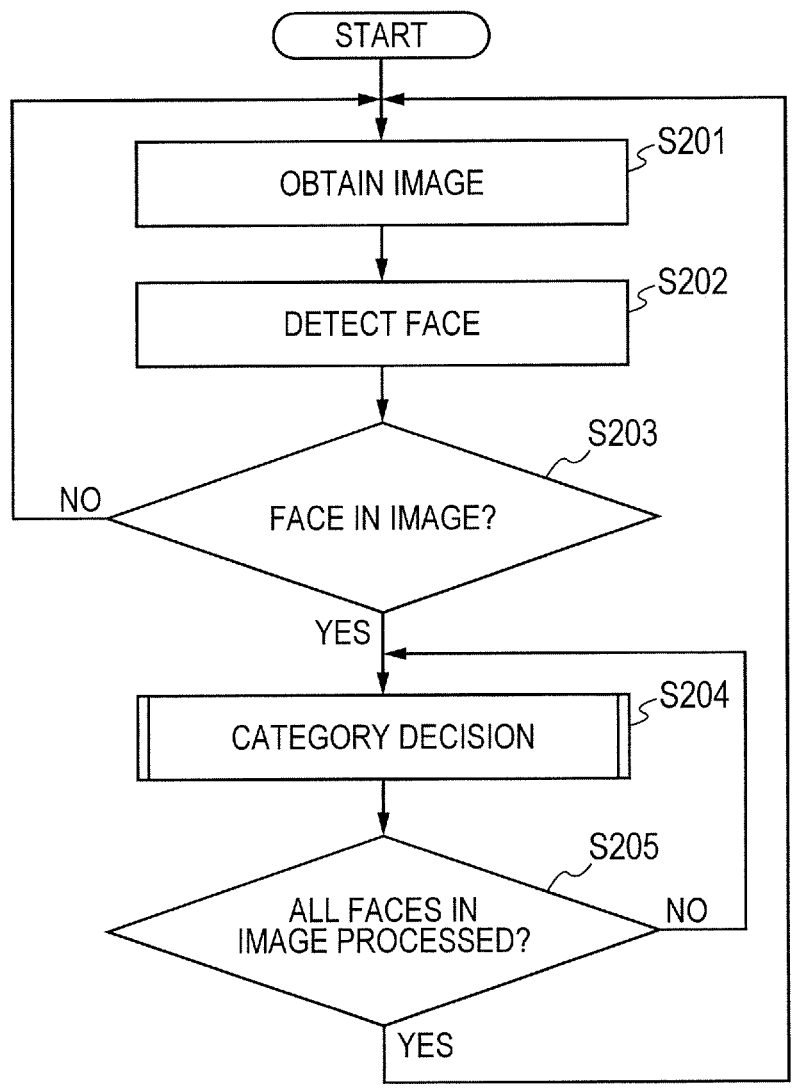
FIG. 2 is a flow chart indicating an example of a processing procedure for discriminating a face image.

FIG. 2 is a flow chart indicating an example of a processing procedure for discriminating a face image according to the image discriminating unit 120 of the object discriminating apparatus 100 in the present embodiment. Hereinafter, an actual process that the object discriminating apparatus 100 according to the present embodiment discriminates the face image will be described with reference to FIG. 2. First, the image inputting unit 110 obtains an entire image (a picked-up image) to be processed (S201). Subsequently, the image discriminating unit 120 performs a face detecting process to the obtained entire image (S202). Note that the face detection is performed by using the known technology.

Next, the image discriminating unit 120 decides whether or not a face exists in the entire image (S203). As a result of this decision, when the face does not exist in the entire image (in case of "NO" in S203), a flow returns to S201, and a next entire image is obtained. On the other hand, when the face exists in the entire image (in case of "YES" in S203), the image discriminating unit 120 extracts a face image related to the detected face from the entire image as an input image, and a process of deciding a category of face, that is, a person is performed (S204). Although the details of a category deciding process in S204 will be described later, the similarity, which indicates that the input image is how real to the identical person, is calculated for the respective registration images in the category deciding process. A registration image of the highest similarity is selected by comparing the respective similarities with each other, and a category of the registered person is decided as a category of the input image.

Subsequently, the image discriminating unit 120 decides whether or not processes were performed for all the faces in the entire image to be processed (S205). As a result of this decision, when the faces not yet decided still remains in the entire image, a flow returns to S204, and the category deciding process (S204) is repeated to the next face image. On the other hand, as a result of the decision in S205, when the processes were performed for all the faces (in case of "YES" in S205), a picked-up image (an entire image) at the next time of day is obtained (S201). A series of the above processes are performed in real time, and a category decided result can be also output to the external outputting unit 140 in real time. As to a series of processes indicated in FIG. 2, operations thereof may be accepted such that the processes can be terminated by a process that a user operates an operating member.

Figure 3:
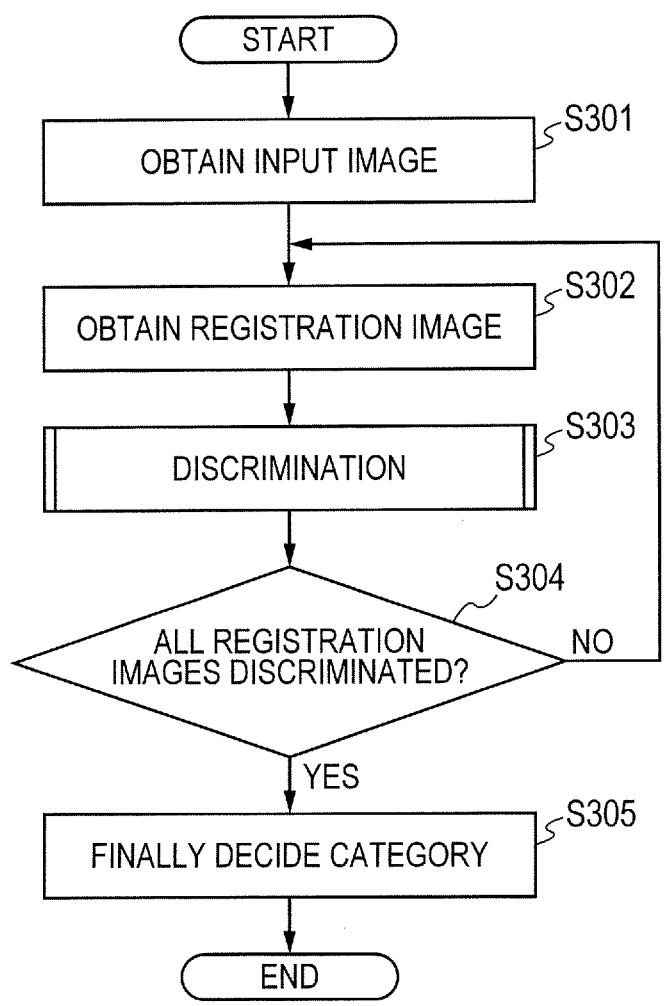
FIG. 3 is a flow chart indicating an example of the detailed procedure of a category deciding process.

FIG. 3 is a flow chart indicating an example of the detailed procedure of the category deciding process performed by the image discriminating unit 120 in S204 of FIG. 2. Hereinafter, a process that the object discriminating apparatus 100 decides a category of the input image will be described with reference to FIG. 3. First, the image discriminating unit 120 obtains a face image, of which the face was detected from the entire image, as input data (S301). This input image is a still image, and it is premised that only one person's face is captured. Next, the image discriminating unit 120 obtains one face image (registration image), which is previously registered in the registration image recording unit 130 of the object discriminating apparatus 100, as registration data (S302).

Subsequently, the image discriminating unit 120 discriminates the input image from the registration image and obtains the similarity which represents whether or not a person is the identical person (S303). The details of this discriminating process will be described later. The image discriminating unit 120 decides whether or not the discriminating process was performed with the all registration images held in a storage medium (S304). As a result of this decision, when the registration images which are not compared with the input image exist (in case of "NO" in S304), a flow returns to S302, and the image discriminating unit 120 obtains the next one registration image.

On the other hand, when the similarities to the input image were obtained for all the registration images (in case of "YES" in S304), the image discriminating unit 120 finally decides a category by comparing the highest similarity with a previously set threshold (S305). When the highest similarity is equal to or larger than the threshold, the image discriminating unit 120 decides that a category of the input image is such a category to which the registration image corresponding to the similarity belongs. On the other hand, when the similarity is less than the threshold, the image discriminating unit 120 decides that a category, to which the input image belongs, does not exist. It is preferable that this threshold is previously adjusted according to an object. When this threshold is a small value, although possibility capable of identifying the registered person increases, possibility of misidentifying the registered person also increases. Inversely, when the threshold is increased, although possibility of misidentifying a person who is not registered decreases, possibility incapable of identifying the registered person increases.

<Discriminating Process: Outline>

Figure 4:
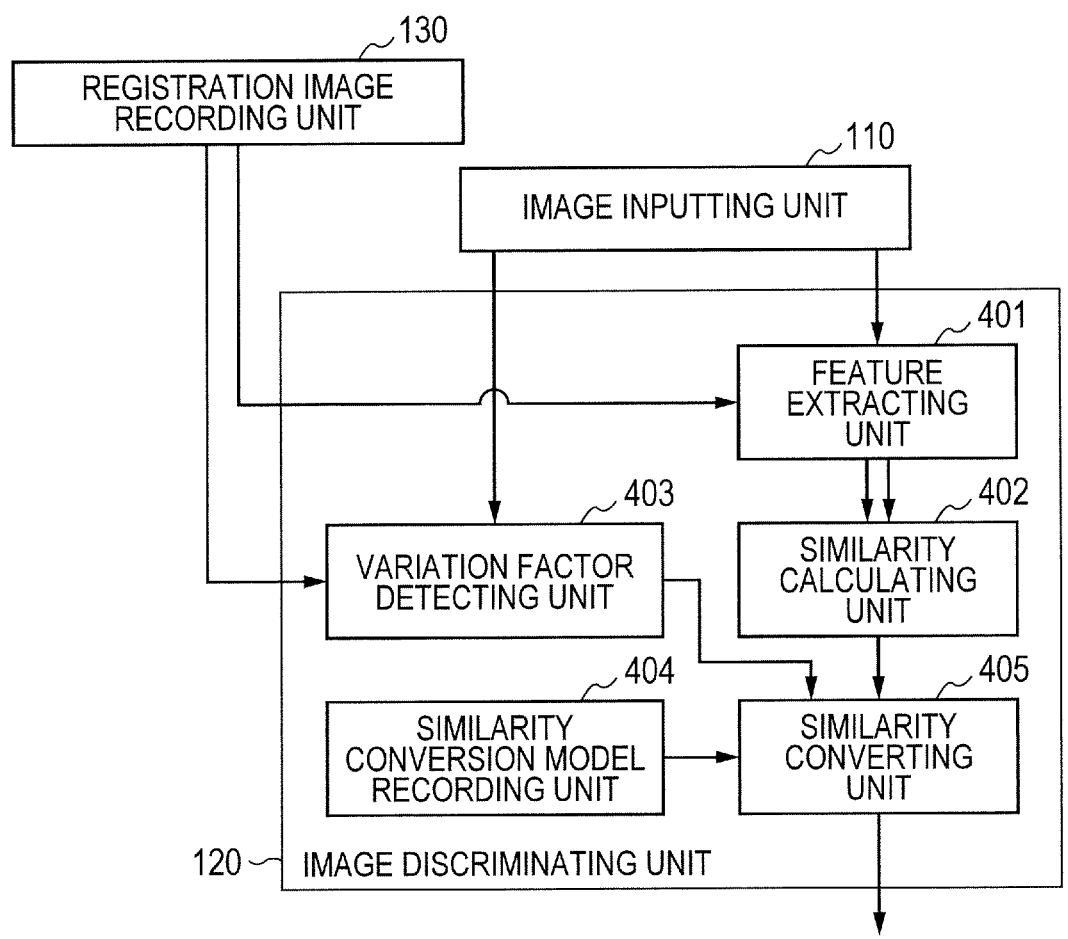
FIG. 4 is a block diagram illustrating an example of the detailed constitution of an image discriminating unit.
Figure 5:
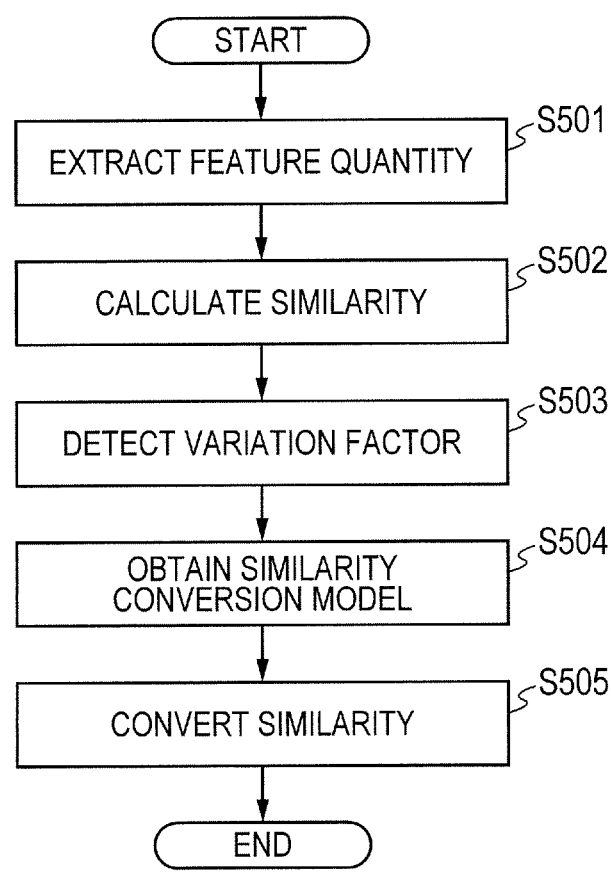
FIG. 5 is a flow chart indicating an example of a detailed procedure for obtaining similarity, which represents whether or not a person is the identical person, in the embodiment.

Next, an outline regarding a discriminating process (S303) in FIG. 3 will be described. FIG. 4 is a block diagram illustrating an example of the detailed constitution of the image discriminating unit 120. In addition, FIG. 5 is a flow chart indicating an example of a detailed procedure of S303 in FIG. 3. Hereinafter, it will be described with reference to FIGS. 4 and 5. It is premised that the above face detection and a process of extracting the face image from the entire image are to be performed by a feature extracting unit 401.

First, the feature extracting unit 401 extracts feature quantities from the input image and the registration image respectively (S501). Next, a similarity calculating unit 402 compares the feature quantity of the input image with that of the registration image and calculates the similarity (S502). Subsequently, a variation factor detecting unit 403 detects values of respective variation factors of the input image and the registration image (S503). Then, a similarity converting unit 405 determines a converting method of the similarity from the values of variation factors detected in S503 and obtains the necessary conversion model from a similarity conversion model recording unit 404 (S504). Further, the similarity is converted by using the obtained conversion model (S505). The details of a process of each of the respective steps will be described later.

In S501 and S503 in FIG. 5, although the feature quantity and the variation factor are obtained also regarding the registration image, it is desirable that the feature quantity and the variation factor are previously obtained with regard to the registration image and recorded in the registration image recording unit 130 together with the face image. Consequently, since only the input image is targeted to be processed in S501 and S503, the processing amount can be suppressed.

<Discriminating Process: Feature Extraction>

Here, a feature extracting process (S501) in FIG. 5 will be described. In this process, the feature quantity necessary for discriminating an individual is extracted from the input image. In the present embodiment, in order to simplify the subsequent description, the feature quantity is extracted as follows. First, a rectangular area, from which the feature quantity is extracted, is set at the face image. Although the size of area is arbitrary, it is preferable that a square, of which length of one side is about 1.5 times as long as a distance between eyes, is positioned at the center of a face so that organs such as eyes, a mouth and the like well representing the feature of an individual are all included and a background is not included in the area. Subsequently, pixel values within the rectangular area are sequentially extracted from the upper left position toward the lower right position and the extracted pixel values are connected in a row to form the vector, which is treated as the feature quantity.

<Discriminating Process: Similarity Calculation>

Next, a similarity calculating process (S502) in FIG. 5 will be described. In this process, the feature quantity of the input image is collated (or compared) with the feature quantity of the registration image, and the similarity is calculated. Although the calculating method is arbitrary, such a calculation method, which indicates that when the similarity becomes higher, the feature quantity becomes more similar, is selected. For example, cosine of the angle formed by each other of vectors of the feature quantity may be treated as the similarity, or an inverse number of the Euclidean distance between vectors of the feature quantity may be treated as the similarity.

<Discriminating Process: Variation Factor Detection>

Next, a variation factor detecting process (S503) in FIG. 5 will be described. In this process, the variation factor is detected from the input image. Particularly, in the present embodiment, an example of performing the detection with regard to the yaw rotation of a face will be described. Hereinafter, in the present embodiment, it is premised that a rotation angle in the yaw direction of the face is simply called a face angle.

Although a method of detecting the face angle is not especially limited, for example, it is preferable to use a method described in the "Multi-Subregion Based Probabilistic Approach Toward Pose Invariant Face Recognition: T. Kanade and A. Yamada: 2003". In this method, the edge is detected by the vertical and horizontal Sobel filters, and an intensity image of the edge is treated as the feature quantity in order to extract information capable of deciding the face direction from the face image excepting the individual difference and the illumination condition. Then, this feature quantity is input to a Support Vector Machine, which previously learned about the feature quantity, to be returned to the face angle. Although it has been described with a method where numerical values of continuous quantity can be obtained as the face angle, when it is not reliable even if the face angle is output by continuous values because of the low accuracy of a detecting unit, for example, the face angle may be rounded by ten degrees and output. More roughly, a method, where a rough classification such as right, left, front or the like is output, is also acceptable. Hereinafter, in order to simplify the description, it will be described under the condition that the variation factor detecting unit 403 detects the angle, which was rounded by ten degrees, as a variation factor.

<Discriminating Process: Obtaining of Similarity Conversion Model>

Next, a process of obtaining a similarity conversion model (S504) in FIG. 5 will be described. In this process, an appropriate similarity conversion model is selected from the similarity conversion model recording unit 404 based on a combination of a variation factor of the input image and a variation factor of the registration image.

First, the configuration of a conversion model group held by the similarity conversion model recording unit 404 will be described. In the present embodiment, the face angle is treated as the variation factor, and the similarity conversion model recording unit 404 previously holds a conversion model corresponding to a combination of the face angles. Here, as an example of representing a combination of the face angles, generally, a method of representing it as a two-dimensional quantity of "the face angle of the registration image and the face angle of the input image" is considered.

Figure 6:
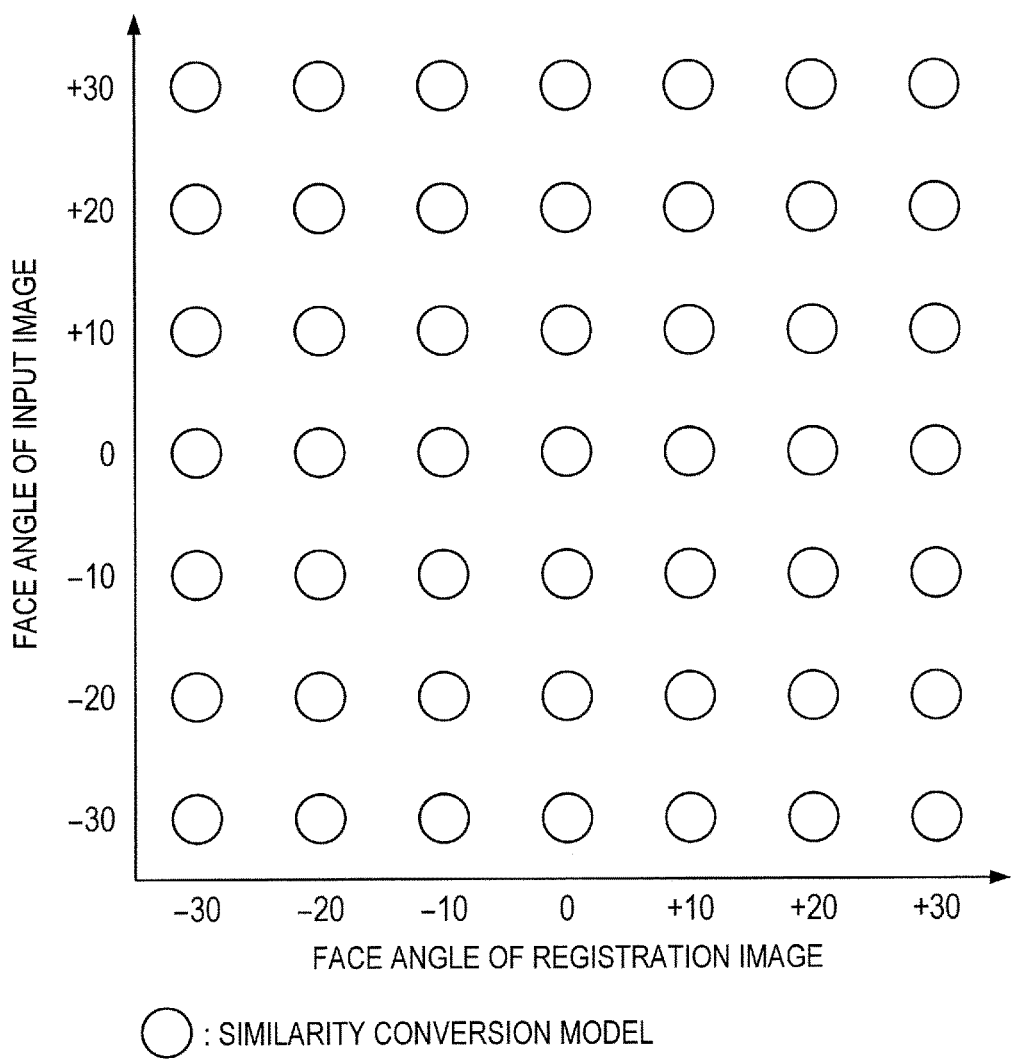
FIG. 6 is a diagram for describing a conversion model of the similarity in case of representing the similarity as a two-dimensional quantity of face angles of a registration image and face angles of an input image.

As illustrated in FIG. 6, when conversion models corresponding to the respective two-dimensional quantities are held, the number of the conversion models becomes the squares of the number of variation factors. Therefore, when a range which can be taken by the face angle is expanded (for example, it is expanded from ±30° to ±60°) or the granularity of holding the conversion model is fined (for example, a face angle is changed from a unit of ten degrees to a unit of five degrees), the number of values which can be taken by the variation factor increases, and the number of the conversion models increases at an accelerated rate.

Figure 7:
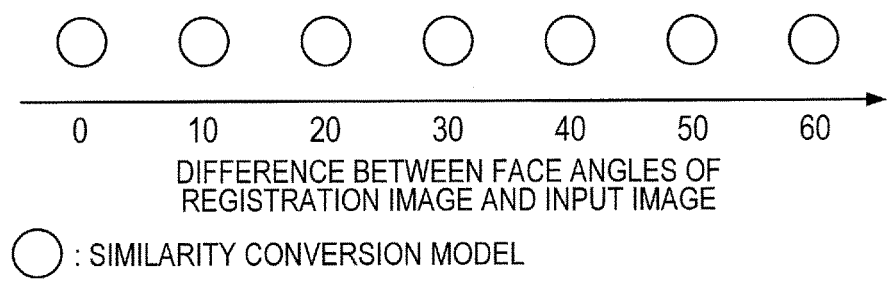
FIG. 7 is a diagram for describing a conversion model of the similarity based on a difference between the face angles.

Therefore, in the present embodiment, the difference between the variation factor of the registration image and the variation factor of the input image, that is, the difference between the face angles is used as the conversion model as indicated in FIG. 7. When this method is used, since only the conversion models, of which the number corresponds to the difference between the variation factors, have to be held, the number of the conversion models is equal to the number of the variation factors, and the number of the conversion models does not increase at an accelerated rate.

The similarity converting unit 405 obtains the face angles of the registration image and the input image from the variation factor detecting unit 403 and calculates the difference between the face angles. Then, one conversion model, which corresponded to the difference between the face angles, is obtained from the similarity conversion model recording unit 404. Note that not only one conversion model but also plural conversion models may be obtained. For example, when processing accuracy of the variation factor detecting unit 403 is low, the conversion model which corresponded to the calculated difference between the face angles and plural conversion models which corresponded to the difference closed to the above difference may be selected with a weighted state. In case of selecting the plural conversion models, since the plural similarities after the conversion can be obtained in a process of the next S505, a linear sum obtained by weighting the similarities may be treated as the final similarity. In the present embodiment, in order to simplify the subsequent description, it will be described under the condition that one conversion model which corresponded to the difference between the face angles is obtained.

<Discriminating Process: Similarity Conversion>

Next, a similarity converting process (S505) in FIG. 5 will be described. Before describing the process, an object of the process to be performed in the similarity converting unit 405 will be described. The above similarity is such a value which indicates that how the registration image is physically similar to the input image. Here, a problem in case of judging a person by using the similarity itself will be described with reference to FIGS. 8A and 8B.

FIG. 8A indicates a probability distribution of the similarity when the face angles of the registration image and the input image are in the same condition. Note that a solid line represents the similarity which can be obtained by a collation (or comparison) between identical persons and a broken line represents the similarity which can be obtained by a collation between other persons. FIG. 8B indicates a probability distribution of the similarity when the face angles of the registration image and the input image are in the different condition.

As illustrated in FIGS. 8A and 8B, there is no doubt that the similarity between identical persons can obtain higher value as compared with the similarity between other persons even when the face angles of the registration image and the input image are in the same condition and even when the face angles of the registration image and the input image are in the different condition. However, when the face angles are different from each other, since not only the variation of the feature quantity due to the difference of a person but also the variation of the feature quantity due to the difference of the face angles are added, there is such a tendency that low values are generally obtained regarding the similarity between identical persons and the similarity between other persons. If this tendency appears, the similarity between other persons indicated in FIG. 8A becomes higher than the similarity between identical persons indicated in FIG. 8B, and there is the possibility of occurring the erroneous authentication. That is, an object of converting the similarity is to prevent the inversion of magnitude relation depending on the variation factor regarding the physical similarity between the images.

The similarity converting unit 405 converts the similarity by using a conversion model obtained in accordance with the difference between the face angles of the registration image and the input image. Although a specific method of the conversion is not especially limited, in the present embodiment, it is premised that a method described in the "Multi-Subregion Based Probabilistic Approach Toward Pose Invariant Face Recognition: T. Kanade and A. Yamada: 2003" is used. Hereinafter, a procedure of the conversion will be described.

When the difference between the face angles of the registration image and the input image is defined as $\phi$ and the similarity is defined as s, the conversion model which corresponds to the difference between the face angles holds an occurrence probability distribution $P(s|same, \phi)$ of the similarity between identical persons and a different occurrence probability distribution $P(s|diff, \phi)$ of the similarity between other persons. Then, the physical similarity s is converted into the probability $P(same|s, \phi)$, which is the similarity obtained between identical persons, by the following expression (1). Similar to the physical similarity, when this value becomes larger, it can be judged that the collation is performed between identical persons. It is preferable that the occurrence probability distributions P (s|same, φ) and P (s|diff, φ) are previously statistically obtained by using a lot of face images before operating the device. Although it is not especially limited that the occurrence probability distributions P (s|same, φ) and P (s|diff, φ) are held by what kind of format, there are several methods according to capacity of recordable parameters. Only the parameters of average and variance may be held by approximating the occurrence probability distribution to a normal distribution or a lookup table, where the occurrence probability distribution is quantized into the limited number, may be held.

$$P(\text{same} | s, \phi) = \frac{P(s | \text{same}, \phi) P(\text{same})}{P(s | \text{same}, \phi) P(\text{same}) + P(s | \text{diff}, \phi) P(\text{diff})} \quad (1)$$

$$P(\text{same}) \ll P(\text{diff})$$

As described above, in the present embodiment, the conversion model which corresponds to a combination of the respective values of variation factors of the registration image and the input image is treated as a conversion model for "the difference between values of variation factors of the registration image and the input image" but not for the two-dimensional quantity of "a variation factor of the registration image and a variation factor of the input image". As a result, the number of conversion models can be reduced by integrating conversion models, which correspond to combinations of values of plural variation factors, into one conversion model.

A reason of satisfying this embodiment does not depend on the variation factor itself of the registration image and the variation factor itself of the input image but depends on a fact that such a phenomenon, in which the occurrence probability distribution (hereinafter referred to as the similarity distribution) of the similarity is almost the same distribution, is experimentally satisfied if the difference between the variation factors is the same difference. For example, as indicated in FIGS. 9A and 9B, when the difference between the variation factors (face angles) becomes thirty degrees, as a combination of "a variation factor of the registration image and a variation factor of the input image", there are plural combinations such as a combination of "−15°, +15°" indicated in FIG. 9A and a combination of "0°, +30°" indicated in FIG. 9B. On the other hand, although the occurrence probability distribution illustrated in FIG. 9A and the occurrence probability distribution illustrated in FIG. 9B are not coincided with each other strictly, these are almost the same, and it can be understood that these distributions can be integrated into one distribution. Therefore, when the similarity distribution is approximately represented by the above normal distribution, a lookup table or the like, the conversion models are integrated into one conversion model in the present embodiment by utilizing a fact that it is experimentally satisfied that the similarity distributions can be settled in the allowable difference.

Second Embodiment

In the first embodiment, only the difference between the face angles was treated as a combination of the variation factors. For this fact, in the second embodiment, not only the difference in visibility (difference between face angles) generated by the positional relation between an object and an image pickup device but also the difference in visibility due to the environment, where an object was placed, are considered as the variation factors. Specifically, in the present embodiment, the similarity is converted in accordance with the face angle described in the first embodiment and further the illumination condition (a direction of a light source). Hereinafter, a part different from that of the first embodiment regarding the processing contents performed in a discriminating process will be described. Since other processes, constitution and like are the same as those in the first embodiment, the description will be omitted.

<Discriminating Process: Variation Factor Detection>

Figure 10:
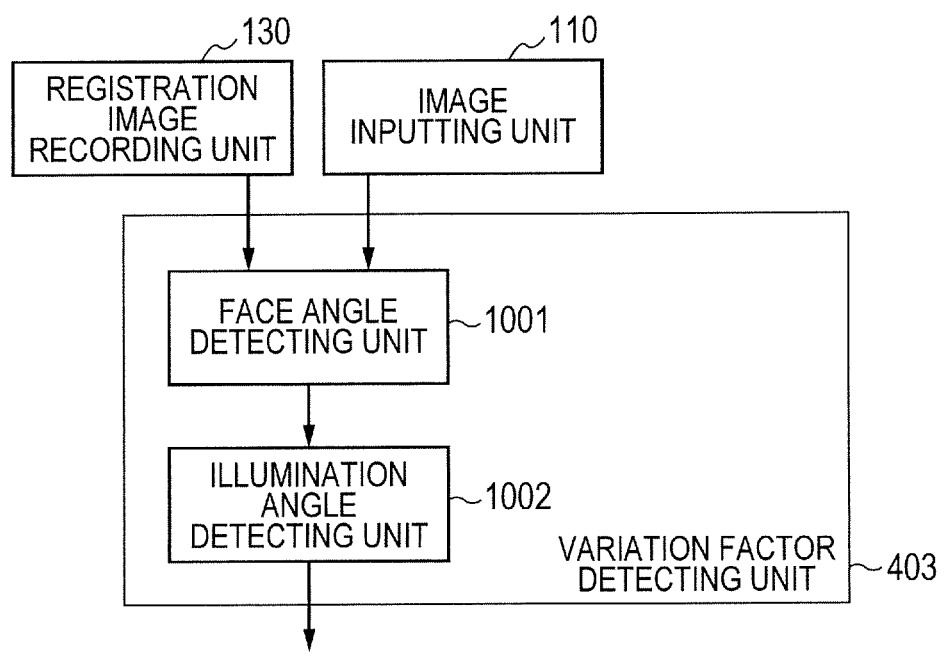
FIG. 10 is a block diagram illustrating an example of the detailed constitution of a variation factor detecting unit in the second embodiment.

First, the variation factor detecting unit 403 illustrated in FIG. 4 and a detecting process of the variation factor (S503) indicated in FIG. 5 will be described. FIG. 10 is a block diagram illustrating a detailed constitutional example of the variation factor detecting unit 403 in the present embodiment. As illustrated in FIG. 10, the variation factor detecting unit 403 has a face angle detecting unit 1001 and an illumination angle detecting unit 1002. The face angle detecting unit 1001 detects the yaw angle of the face which was described in the first embodiment as the face angle. As to the process, since it is the same as that in the first embodiment, the description will be omitted.

The illumination angle detecting unit 1002 detects a yaw direction angle of a light source, which especially lights a face, as the illumination condition. Hereinafter, the yaw direction angle of the light source will be simply called an illumination angle in the present embodiment.

Although a method of detecting the illumination angle from the face image is not especially limited, for example, the detection can be performed by the following method. First, the face image is reduced to an image of the low resolution. At this time, it is desirable to reduce to such an extent characterized in that although the detail feature of eyes or mouse is faded out and an individual cannot be specified, the shade or side light of a face can be barely confirmed. Subsequently, each of pixel values of the reduced face image is regarded as an image vector, and an inner product value of the previously obtained characteristic vector and the image vector, of which an image is reduced to the image of the low resolution, is calculated. This inner product value is attribute information for representing the illumination condition of a face.

The characteristic vector is constituted by a process that a lot of face images, to which the light is applied from various directions, are previously collected and an analysis of main components is performed to those face images. Typically, one of several characteristic vectors which correspond to the face image especially having a large characteristic value can be represented as an illumination angle. When the inner product values are calculated to a lot of image groups having various illumination angles, a characteristic vector which can be represented as an illumination angle can be found by utilizing a fact that a variance of the inner product values becomes extremely large typically.

In the present embodiment, although the characteristic vector is used in order to detect the direction of the illumination, when the intensity of illumination or a color image is used by selecting the characteristic vector with the same method, another illumination condition such as a color of the illumination can be also detected. Hereinafter, in order to simply the description, it will be described under the condition that the illumination angle detecting unit 1002 rounds the obtained inner product value and outputs the illumination angle every ten degrees.

<Discriminating Process: Obtaining of Similarity Conversion Model>

Next, a process of obtaining a similarity conversion model (S504) in FIG. 5 will be described. In this process, a conversion model is selected from the similarity conversion model recording unit 404 based on a combination of a variation factor of the input image and a variation factor of the registration image.

Hereinafter, as to the constitution of a conversion model group held by the similarity conversion model recording unit 404, a point different from the constitution in the first embodiment will be described.

Figure 11:
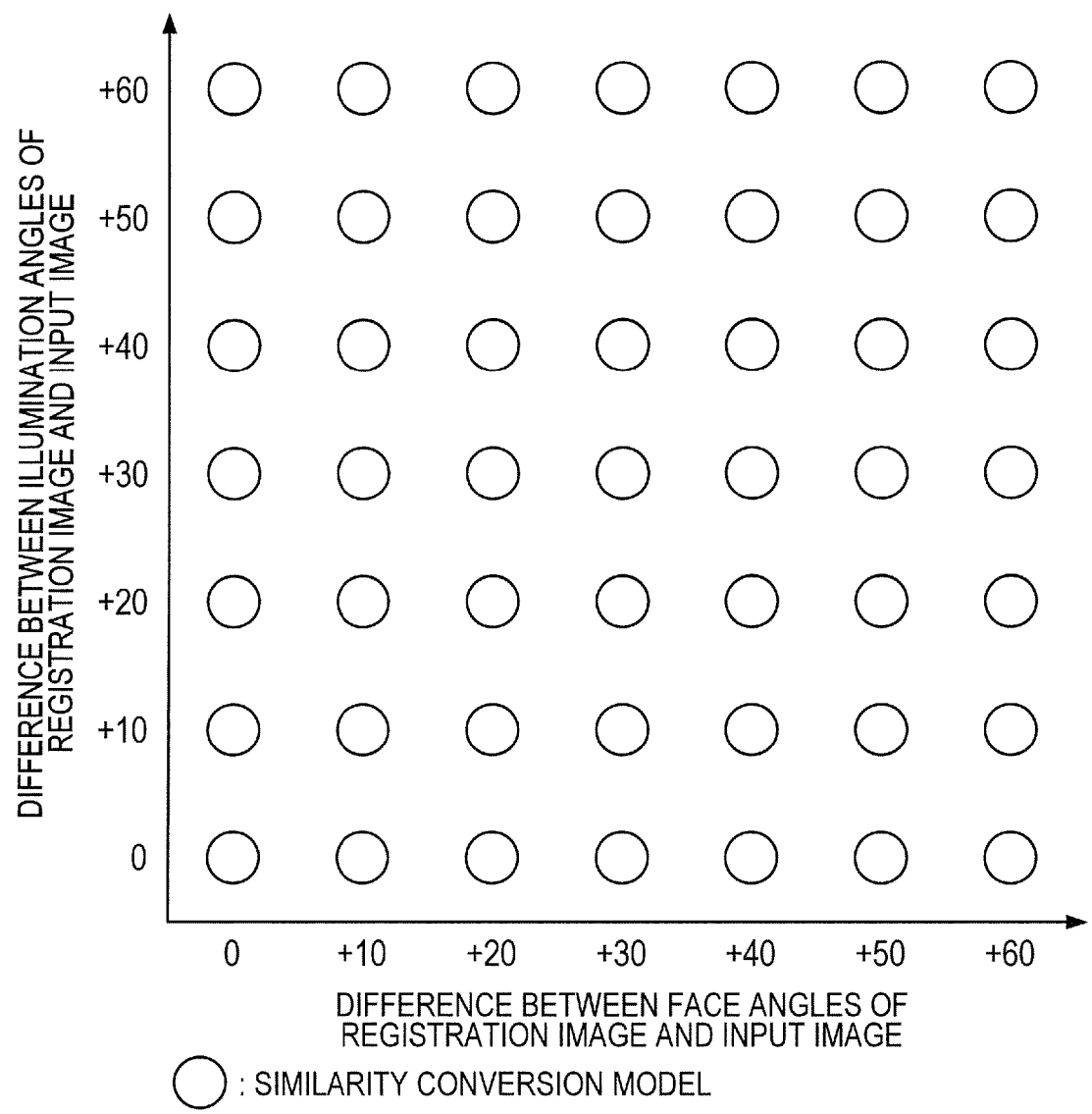
FIG. 11 is a diagram for describing a conversion model of the similarity in case of representing the similarity as two-dimensional quantities of the difference between face angles and the difference between illumination angles.

In the present embodiment, the face angle and the illumination angle are used as variation factors, and the similarity conversion model recording unit 404 previously holds a conversion model which corresponds to a combination of the face angle and the illumination angle. As an example of a method of representing a combination of the face angle and the illumination angle, one method of representing the combination as the four-dimensional quantity of "a face angle of the registration image, a face angle of the input image, an illumination angle of the registration image and an illumination angle of the input image" can be considered. However, when this method is used, since the number of conversion models is the fourth power of the number of the variation factors, it is considered that the number of conversion models becomes very large. Therefore, in the present embodiment, as illustrated in FIG. 11, it is represented as the difference between the variation factors of the registration image and the input image, that is, as the two-dimensional quantity of "the difference between the face angles and the difference between the illumination angles". When this method is used, since the number of conversion models is equal to such the number, which is obtained by the calculation that the number of the face angles is multiplied by the number of the illumination angles, the number of conversion models can be suppressed.

The similarity converting unit 405 obtains the face angles of the registration image and the input image from the variation factor detecting unit 403 and calculates the difference between the face angles. Similarly, the similarity converting unit 405 obtains illumination angles of the registration image and the input image and calculates the difference between the illumination angles. Then, one conversion model which corresponds to "the difference between face angles and the difference between illumination angles" is obtained from the similarity conversion model recording unit 404.

<Discriminating Process: Similarity Conversion>

Next, the similarity converting process (S505) in FIG. 5 will be described. The similarity converting unit 405 in the present embodiment converts the similarity by using the conversion model obtained in accordance with "the difference between face angles and the difference between illumination angles" between the registration image and the input image. When the similarity is defined as s in the difference ϕ between the face angles and the difference ρ between the illumination angles of the registration image and the input image, the conversion model in the present embodiment holds an occurrence probability distribution P (s|same, ϕ, ρ) of the similarity between identical persons and an occurrence probability distribution P (s|diff, ϕ, ρ) of the similarity between other persons. Then, the physical similarity s is converted into the probability P (same|s, ϕ, ρ), which is the similarity obtained between identical persons, by the following expression (2). Similar to the physical similarity, when this value becomes larger, it can be judged that the collation is performed between identical persons. Note that the occurrence probability distributions P (s|same, ϕ, ρ) and P (s|diff, ϕ, ρ) are previously statistically obtained by using a lot of face images before operating the apparatus.

$$P(\text{same} | s, \phi, \rho) = \frac{P(s | \text{same}, \phi, \rho)P(\text{same})}{P(s | \text{same}, \phi, \rho)P(\text{same}) + P(s | \text{diff}, \phi, \rho)P(\text{diff})} \quad (2)$$

$$P(\text{same}) \ll P(\text{diff})$$

In the present embodiment, an example, where two variation factors of the face angle and the illumination angle were combined, has been described. Further, also in a case where three or more variation factors exist, it can be expanded with a method which is the same as that of the present embodiment by taking the difference every variation factor. In the description of the present embodiment, although the variation factors were two factors of the face angle and the illumination angle, a method similar to that of the present embodiment can be utilized even by another variation factor. For example, in case of discriminating a person's face, the face angle not only in the yaw direction but also in the pitch direction, the resolution of a face, the intensity of illumination, the degree of a specific expression and the like are treated as the variation factors, and the similarity can be converted by using a conversion model which corresponds to the difference between those variations.

Third Embodiment

In the first and second embodiments, the single feature quantity is extracted from the face image and the single similarity is obtained by collating the single feature quantity of the input image with that of the registration image, thereafter the similarity is converted. In the present embodiment, an example, where plural feature quantities are extracted from the face image and the feature quantities of the input image are respectively collated with those of the registration image and the plural similarities are obtained and then these similarities are converted, will be described. Hereinafter, as to the contents of a process to be performed in the discriminating process, a part different from the contents of the first embodiment will be described. Since other processes, the constitution and the like are similar to those in the first embodiment, the description will be omitted.

<Discriminating Process: Feature Extraction>

First, the feature extracting process (S501) in FIG. 5 will be described. In this process, the feature quantity necessary for discriminating an individual is extracted from the input image. In the first embodiment, a square, of which length of one side is about 1.5 times as long as a distance between eyes, was set at a face area, and the pixel value was extracted. On the other hand, in the present embodiment, plural local areas are positioned only at portions, where the individual difference of a face appears, and the feature quantities are extracted from the respective local areas.

Although the size, form and place of the local area are arbitrary, the following method is preferable as one example. Rectangular areas of which the size is almost the same as the size of organs are set so as to overlap with organs such as eyes, a mouth and the like well representing the feature of an individual. As to the coordinates used for setting the rectangular area, although the coordinates which are common for all the face images may be fixedly used, it is not sure that the organ is always fitted in a rectangular area due to the direction of a face or the shape of a face depending on the individual difference. Therefore, for example, a face organ detecting method described in "Active Shape Models—Their Training and Application: T. F. Cootes, C. J. Taylor, D. Cooper, and J. Graham: 1998" is used, and a position of a face organ such as eye, nose, mouth or the like is detected. Then, the local area may be set around the detected organ position.

When the local area is desired to be set on a place other than a face organ in the face area, a line segment connecting positions of two face organs is obtained, and the local area is set around such a position obtained by dividing the line segment with a predetermined ratio. According to this method, the local area can be set on an appropriate place without depending on the relative positional relation of the face organ due to the individual difference or age.

Subsequently, pixel values within the local area are sequentially extracted from the upper left position toward the lower right position, and the pixel values are connected in a row to form the vector. This vector is treated as one local feature quantity, and the local feature quantity is extracted from the each local area. In the present embodiment, it will be described under the condition that the N local feature quantities are to be obtained.

<Discriminating Process: Similarity Calculation>

Next, a similarity calculating process (S502) in FIG. 5 will be described. In this process, the local feature quantity of the input image is collated with the local feature quantity of the registration image, and the local similarity $s_j$ (j=1, . . . N) is calculated. Note that since a method of calculating the similarity is the same as that of the first embodiment, the description will be omitted.

<Discriminating Process: Obtaining of Similarity Conversion Model>

Next, a process of obtaining a conversion model of the similarity (S504) in FIG. 5 will be described. In this process, the conversion model is selected from the similarity conversion model recording unit 404 on the basis of a combination of the variation factor of the input image and the variation factor of the registration image. Although the configuration of the conversion model group held by the similarity conversion model recording unit 404 is the same as that of the first embodiment, since the N local similarities are converted in the present embodiment, the N conversion models are selected.

As to the local feature quantities obtained in the S501, since positions to be set on a face are respectively different, the variations of the similarity distribution influenced by the variations of the face angle are different. Therefore, in the present embodiment, the configuration of the conversion model group illustrated in FIG. 7 is independently held so as to correspond to the respective local feature quantities. The similarity converting unit 405 selects one conversion model corresponding to the difference between the face angles for the respective local feature quantities and obtains the N conversion models from the similarity conversion model recording unit 404.

<Discriminating Process: Similarity Conversion>

Next, the similarity converting process (S505) in FIG. 5 will be described. The similarity converting unit 405 converts the similarity by using a conversion model obtained in accordance with the difference $\phi$ between the face angles of the registration image and the input image. Although a process to be performed here is basically similar to that of the first embodiment, in the present embodiment, the N local similarities are independently converted. Here, as to the j-th (j=1, . . . N) local similarity $s_j$, the conversion model which corresponds to the difference $\phi$ between the face angles holds an occurrence probability distribution $P_j(s_j|same, \phi)$ of the similarity between identical persons and an occurrence probability distribution $P_j(s_j|diff, \phi)$ of the similarity between other persons. Then, the physical similarity $s_j$ is converted into the probability $P_j(same|s_j, \phi)$, which is the similarity obtained between identical persons, by the following expression (3). Similar to the physical similarity, when this value becomes larger, it can be judged that the collation is performed between identical persons. Similar to the first embodiment, the occurrence probability distributions $P_j(s_j|same, \phi)$ and $P_j(s_j|diff, \phi)$ are previously calculated by taking statistics of the local similarity $s_j$ obtained by using a lot of face images before operating the apparatus.

$$P_j(same|s_j, \phi) = \frac{P_j(s_j|same, \phi)P(same)}{P_j(s_j|same, \phi)P(same) + P_j(s_j|diff, \phi)P(diff)} \quad (3)$$

$$(j = 1 \ldots N)$$

$$P(same) \ll P(diff)$$

At the end, the obtained N $P_j(same|s, \phi)$ are integrated in one and converted into the final probability $P(same|S_j, \phi)$ which is the similarity obtained between identical persons. Although this method is not especially limited, for example, it may be the sum of all the $P_j(same|s_j, \phi)$ in accordance with a method described in "Multi-Subregion Based Probabilistic Approach Toward Pose Invariant Face Recognition: T. Kanade and A. Yamada: 2003". As described above, according to the present embodiment, the number of conversion models can be reduced even when plural similarities are obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-073819, filed Mar. 31, 2014, which is hereby incorporated by reference herein in its entirety.

What is claimed is:

1. An object discriminating apparatus comprising:
one or more processors; and
a memory coupled to the one or more processors, the memory having stored thereon instructions which, when executed by the one or more processors, cause the apparatus to:
obtain an input image including an object;
extract a feature from the input image;
calculate, by collating the feature extracted from the input image with a feature of a previously registered registration image, similarity between the object included in the input image and an object included in the registration image;
acquire a magnitude of a variation of the input image and a magnitude of a variation of the registration image;
calculate a value of a difference between the magnitude of the variation of the input image and the magnitude of the variation of the registration image;
select a conversion model corresponding to the value of the difference from a plurality of conversion models;
convert the calculated similarity using the selected conversion model; and
determine, on the basis of the converted similarity, whether or not the object included in the input image is identical with the object included in the registration image.

2. The object discriminating apparatus according to claim 1, wherein the instructions, when executed by the one or more processors, further cause the apparatus to convert the similarity by using the conversion model previously prepared corresponding to the value of the difference between the magnitude of the variations, for each of a plurality of kinds of variations.

3. The object discriminating apparatus according to claim 1, wherein the instructions, when executed by the one or more processors, further cause the apparatus to select a plurality of conversion models on the basis of the value of the difference between the magnitude of the variations, and to integrate a plurality of similarities respectively converted using the respective selected conversion models.

4. The object discriminating apparatus according to claim 1, wherein the instructions, when executed by the one or more processors, further cause the apparatus to convert the similarity by using the conversion model which is previously provided with a probability that the similarity occurs by collation between identical objects and a probability that the similarity occurs by collation between different objects, for the value of the difference between the variations.

5. The object discriminating apparatus according to claim 4, wherein the instructions, when executed by the one or more processors, further cause the apparatus to convert the similarity by using the conversion model which is previously provided with the probability that the similarity occurs by the collation between the identical objects and the probability that the similarity occurs by the collation between the different objects, as values of average and variance of a normal distribution.

6. The object discriminating apparatus according to claim 4, wherein the instructions, when executed by the one or more processors, further cause the apparatus to convert the similarity by using the conversion model which is previously provided with the probability that the similarity occurs by the collation between the identical objects and the probability that the similarity occurs by the collation between the different objects, as a quantized lookup table.

7. The object discriminating apparatus according to claim 1, wherein the instructions, when executed by the one or more processors, further cause the apparatus to detect the variation of each of the input image and the registration image,
wherein the value of the difference between a magnitude of the detected variation in the input image and a magnitude of the variation in the output image is calculated.

8. The object discriminating apparatus according to claim 1, wherein the variation includes a direction of the object.

9. The object discriminating apparatus according to claim 1, wherein the variation includes a size or resolution of the object.

10. The object discriminating apparatus according to claim 1, wherein the variation includes a condition of illumination to the object.

11. The object discriminating apparatus according to claim 10, wherein the condition of the illumination includes a direction of a light source or intensity of the illumination.

12. The object discriminating apparatus according to claim 1, wherein the instructions, when executed by the one or more processors, further cause the apparatus to:
extract a plurality of features respectively from the input image and the registration image,
calculate similarities respectively for the plurality of the extracted features, and
convert the plurality of the calculated similarities and integrate the plurality of the converted similarities into one similarity.

13. The object discriminating apparatus according to claim 1, wherein the object includes a person's face.

14. An object discriminating method comprising:
obtaining an input image including an object;
extracting a feature from the input image;
calculating, by collating the feature extracted from the input image with a feature of a previously registered registration image, similarity between the object included in the input image and an object included in the registration image;
acquiring a magnitude of a variation of the input image and a magnitude of a variation of the registration image;
calculating a value of a difference between the magnitude of the variation of the input image and the magnitude of the variation of the registration image;
selecting a conversion model corresponding to the value of the difference from a plurality of conversion models;
converting the calculated similarity using the selected conversion model; and
determining, on the basis of the converted similarity, whether or not the object included in the input image is identical with the object included in the registration image.

15. A non-transitory computer-readable storage medium which stores a program to cause a computer to perform the object discriminating method comprising:

obtaining an input image including an object;
extracting a feature from the input image;
calculating, by collating the feature extracted from the input image with a feature of a previously registered registration image, a similarity between the object included in the input image and an object included in the registration image;
acquiring a magnitude of a variation of the input image and a magnitude of a variation of the registration image;
calculating a value of a difference between the magnitude of the variation of the input image and the magnitude of the variation of the registration image;
selecting a conversion model corresponding to the value of the difference from a plurality of conversion models;
converting the calculated similarity using the selected conversion model; and
determining, on the basis of the converted similarity, whether or not the object included in the input image is identical with the object included in the registration image.

\* \* \* \* \*